United States Patent [19]
Hussaini

[11] Patent Number: 6,161,249
[45] Date of Patent: Dec. 19, 2000

[54] WINDSHIELD WIPER FRAME AND CONNECTOR ASSEMBLY

[75] Inventor: Saied Hussaini, Miami, Fla.

[73] Assignee: Rally Manufacturing, Inc., Miami, Fla.

[21] Appl. No.: 09/237,894

[22] Filed: Jan. 27, 1999

[51] Int. Cl.[7] .................................. B60S 1/40; B60S 1/38
[52] U.S. Cl. ....................... 15/250.32; 15/250.44
[58] Field of Search ........................ 15/250.32, 250.43, 15/250.44, 250.451, 250.452, 250.453, 250.454, 250.201, 250.361, 250.46, 250.47

[56] References Cited

U.S. PATENT DOCUMENTS

| | | |
|---|---|---|
| 3,425,089 | 2/1969 | Quinlan et al. . |
| 3,780,395 | 12/1973 | Quinlan et al. . |
| 5,289,608 | 3/1994 | Kim . |
| 5,606,766 | 3/1997 | Lee ........................................ 15/250.46 |
| 5,632,059 | 5/1997 | Lee ........................................ 15/250.32 |
| 5,885,023 | 3/1999 | Witek et al. ......................... 15/250.32 |

FOREIGN PATENT DOCUMENTS

| | | | |
|---|---|---|---|
| 2501135 | 9/1982 | France .................................. 15/250.32 |
| 2038170 | 7/1980 | United Kingdom ................ 15/250.32 |
| 2231781 | 11/1990 | United Kingdom ................ 15/250.32 |

*Primary Examiner*—Gary K. Graham
*Attorney, Agent, or Firm*—Liniak, Berenato, Longacre & White

[57] ABSTRACT

A windshield wiper frame connector assembly for a windshield wiper assembly for motor vehicles which accommodates different size wiper arms, wherein the assembly accommodates connectors adapted to receive a hook type wiper arm, or a pin type wiper arm, or a bayonet type wiper arm. The wiper blade frame is designed to make assembly and disassembly of the hook-type wiper arms more efficient by providing a cutout portion formed in at least one wall of the wiper frame.

14 Claims, 6 Drawing Sheets

WINDSHIELD WIPER FRAME AND CONNECTOR ASSEMBLY

BACKGROUND OF THE INVENTION

1. Field of the Invention

The present invention relates generally to the construction of a windshield wiper frame and connector and more particularly, to an improved wiper arm and blade unit connector assembly for windshield wipers, whereby the wiper frame accommodates a versatile connector in a manner that permits easy assembly and replacement of the wiper arm.

2. Description of the Prior Art

Various types of windshield wiper arm and blade unit connectors for a windshield wiper assembly are well known. Such windshield wiper frame connectors include a pair of apertured ears pivotally connected to a pin of the pin type arm as shown in the U.S. Pat. No. 3,425,089 to Quinlan et al and U.S. Pat. No. 3,780,395 to Quinlan et al. However, such prior art wiper frame connectors are costly to manufacture and difficult to assemble with the wiper arm and the blade unit due to their complicated structure. Furthermore, such prior art connectors are incapable of receiving the widely used hook type arm of the windshield wiper assembly that restricts their use in many applicable circumstances.

Conventionally, the windshield wiper frame connector 1 as shown in FIG. 1 is equipped with first, second, and third slots 2, 3, and 4 and an L-shaped recess 5 for receiving both the hook type arm and the pin type arm. However, the windshield wiper frame connector 1 suffers from a number of problems. For example, the difference in depth between the first slot 2 of a pin of the blade unit and the second slot of a rolled bushing of the pin type arm causes instability when the pin type arm is connected to the wiper frame connector 1. Moreover, receiving the hook type arm lacks any locking members that would securely lock the hook type arm to the wiper frame connector. The body 6 of such a wiper frame connector 1 uses much material and is heavy in weight. These characteristics and above stated problems are disadvantages in achieving an efficient and economical windshield wiper assembly.

U.S. Pat. No. 5,289,608 to Kim discloses a windshield wiper frame connector shown in FIGS. 2 and 3 which accommodates different size wiper arms and is incorporated herein by reference. The wiper assembly of this patent suffers from serious drawbacks inherent in the wiper frame structure that prevent proper assembly and disassembly of hook-type wiper arms from the wiper frame and the adapter.

The need therefore exists for an improved versatile windshield wiper frame and adapter assembly that is easy to assemble and disassemble, particularly for hook-type wiper arms.

SUMMARY OF THE INVENTION

The present invention provides an improved windshield wiper bridge and connector assembly for use in a windshield wiper assembly for motor vehicles, that improves the assembly process when compared to the prior art designs. The present invention further provides a windshield wiper bridge design wherein a cutout portion is provided in the lower edge of each bridge member in order to facilitate removal of the hook-type wiper arm when it is affixed to the wiper adapter.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
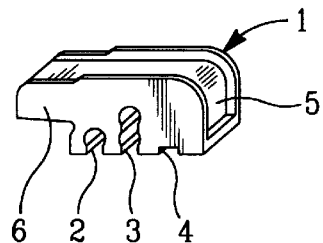
FIG. 1 shows the conventional wiper frame connector.
Figure 2:
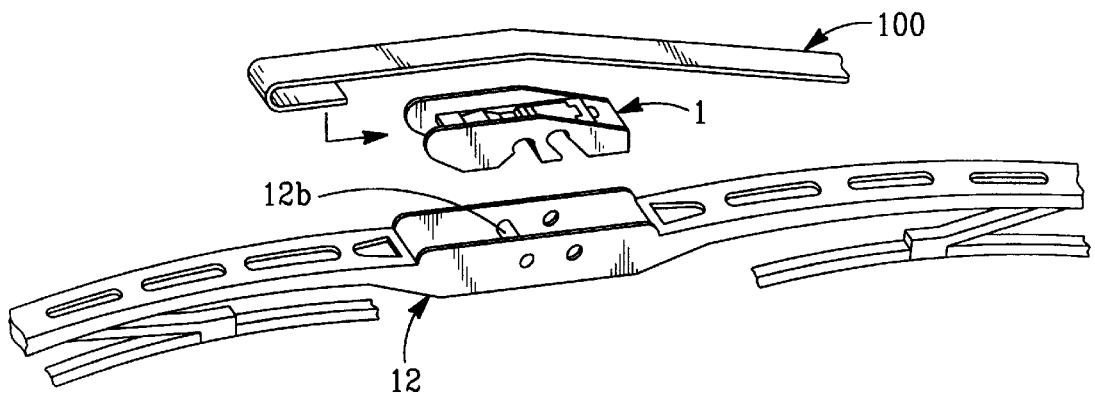
FIG. 2 is a plan view of a prior art windshield wiper frame connector for a hook type wiper arm.
Figure 3:
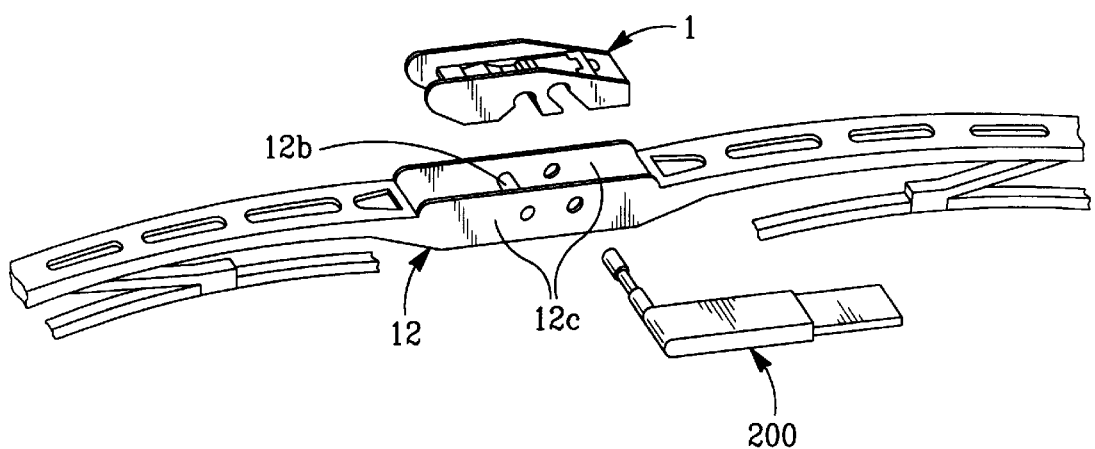
FIG. 3 is a perspective view of a prior art windshield wiper frame connector for a pin type wiper arm.
Figure 4:
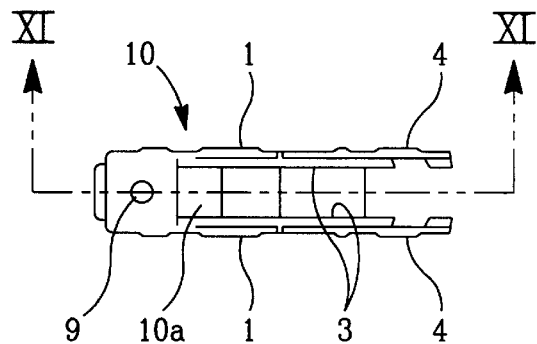
FIG. 4 is a top elevational view of the wiper adapter according to a preferred embodiment of this invention.
Figure 5:
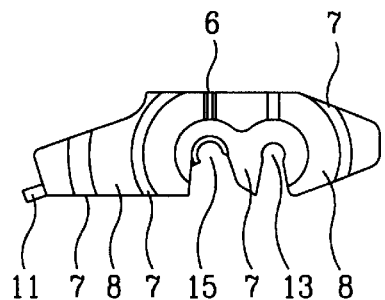
FIG. 5 is a side view of the wiper adapter of FIG. 4.

Referring now to the drawings illustrating preferred embodiments of the present invention, the windshield wiper frame adapter 10 is designed to be connected to any one of a hook type wiper arm 100 (FIG. 2), a pin type wiper arm 200 (FIG. 3), or a bayonet type wiper arm (not shown). The adapter 10 snugly fits between the sidewalls 12c of the wiper frame 12, and it snaps in connecting relation onto the transverse pin 12b. In this manner, the suitable blade unit 12 may be installed as a windshield wiper assembly for a variety of motor vehicles as exemplified by FIGS. 2 and 3.

As shown in FIGS. 4–11, the connector or adapter 10 comprises a body member 10a, a pair of sidewalls 1, and a first slot 13 and a second slot 15 disposed in the lower portion of the body member 10a.

A channel 3 is formed and defined between the sidewalls 1 to accommodate a hook type wiper arm 100. Hook arms 100 of different width may be accommodated within or on top of the channel 3.

The sidewalls 1 each have a wing portion 4 extending forwardly. A pair of retention tabs 5a, 5b, 5c, 5d are formed on the inner surface of each of the wing portions 4. Retention tabs 5a, 5b associated with one of sidewalls each extend more inwardly than a corresponding opposite retention tab 5c, 5d. Such an arrangement has been shown to provide a dramatic improvement in the ease of installation and removal of hook type wiper arms.

A transverse notch 6 (See FIG. 5) is formed in each of the sidewalls 1 to promote flexure of the wiper adapter. In the preferred embodiment, the transverse notch 6 extends downward from a top portion of each sidewall. Such an arrangement particularly provides proper flexure when the wiper adapter is attached to a pin type wiper arm.

Figure 6:
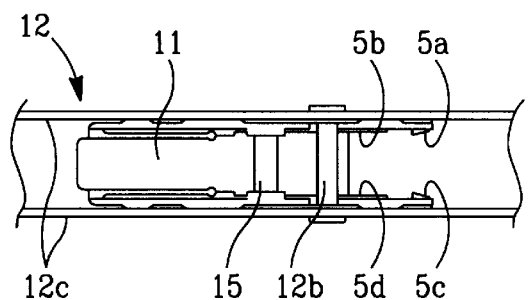
FIG. 6 is a bottom view of the wiper adapter of FIG. 4.
Figure 7:
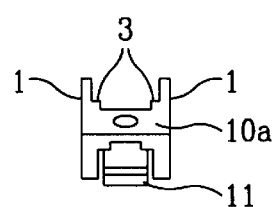
FIG. 7 is a rear view of the adapter of FIG. 4.
Figure 8:
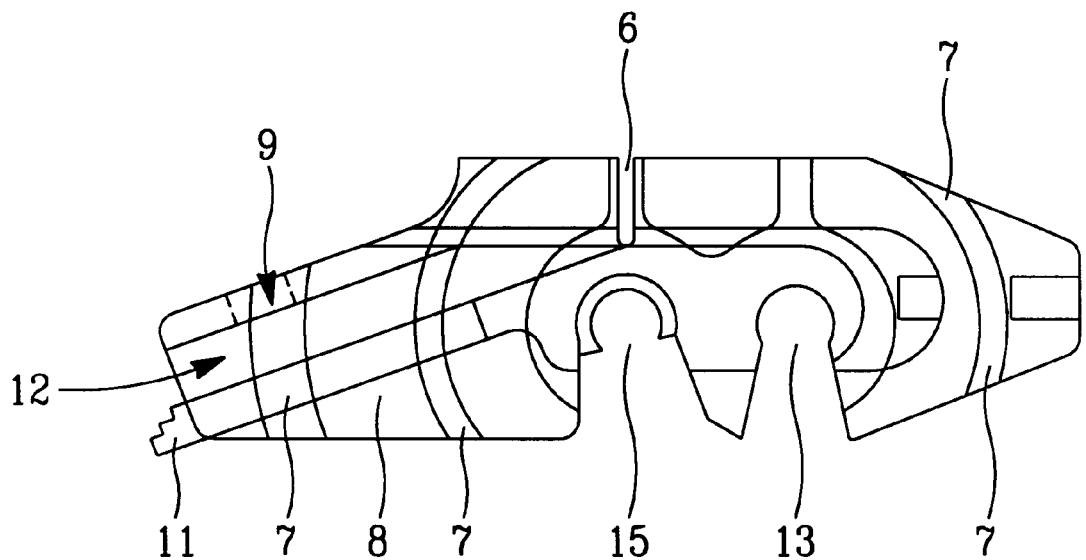
FIG. 8 is an enlarged view of the wiper adapter of FIG. 4.
Figure 9:
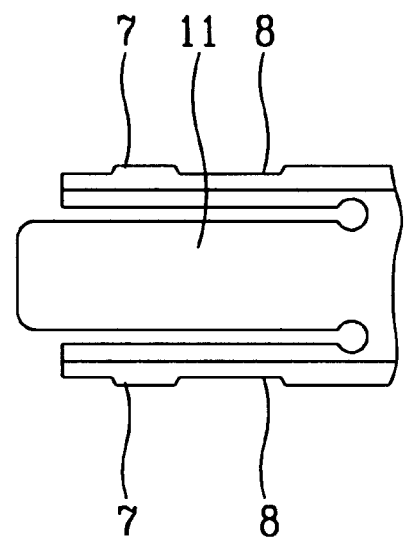
FIG. 9 is an enlarged partial bottom view of the rear portion of the adapter of FIG. 4 showing the cantilevered release tab.

Each of the sidewalls 1 has an external surface with raised bearing surfaces 7 (See FIGS. 5, and 14) which bearing directly against the inner surface of the sidewalls 12c of the wiper frame 12 (See FIG. 6). Such raised bearing surfaces 7 are preferably arranged to define recessed radial channels 8. The recessed radial channels 8 provide space for foreign material such as grease and dirt thereby promoting free rotation of the wiper adapter when pressed between the sidewalls 12c and onto the transverse portion or pin 12b of the main bridge of the wiper blade.

Figure 14:
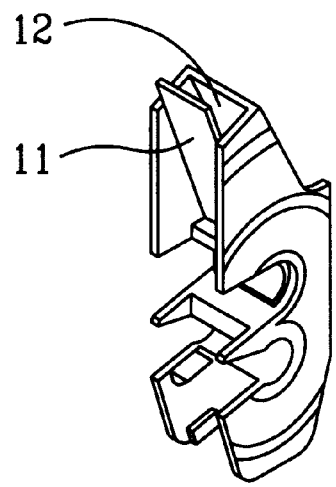
FIG. 14 is the adapter 10 having the retention tabs disposed on the wing portion of the sidewalls being spread apart as during the assembly/disassembly stage.

The wiper blade has a bayonet retention bore 9 to receive an extended portion of the bayonet type wiper arm. FIGS. 5, 6, 7, 9 and 14 show a cantilevered release tab 11 extending from the rear portion of the cross member 2. Referring to FIG. 14, a channel 12 is defined between the cantilevered release tab 11 and the bayonet retention member 9 to retain the bayonet type wiper arm. The release tab 11 extends substantially more rearwardly than the bayonet retention member to facilitate easy removal of the bayonet arm. The release tab 11 is simply depressed at the groove portion 13 such that the release tab deflects downwardly sufficient to allow the extended portion of the bayonet arm to be removed from the bore 9. Such an arrangement has been shown to ease installation and removal of the bayonet arm.

Figure 15:
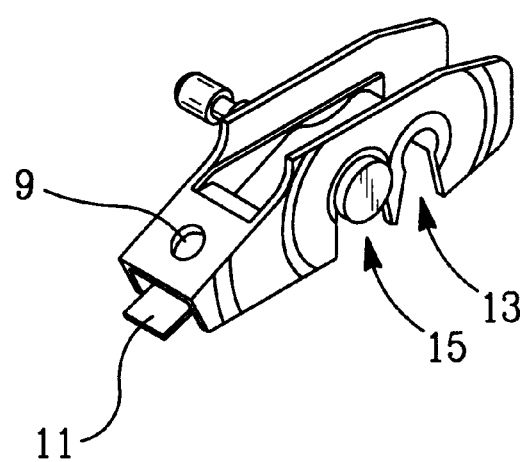
FIG. 15 is a perspective view of the adapter 10 with an adapter pin mounted therein.

A first slot 13, preferably a keyhole slot, is provided in a lower portion of the wiper adapter for rotatably receiving and retaining the transverse pin 12b formed on the wiper blade unit. A second slot 15 is also provided in the lower portion of the wiper adapter adjacent the first slot 13. (See FIG. 15). The second slot 15 is adapted to receive and retain a pin of the pin type wiper arm. A raised arc surface is also provided. In the preferred embodiment, the second slot 15 and the raised arc surface have dimensions to enable respective retainment of ¼ inch and ³⁄₁₆ inch diameter pin arms.

Figure 10:
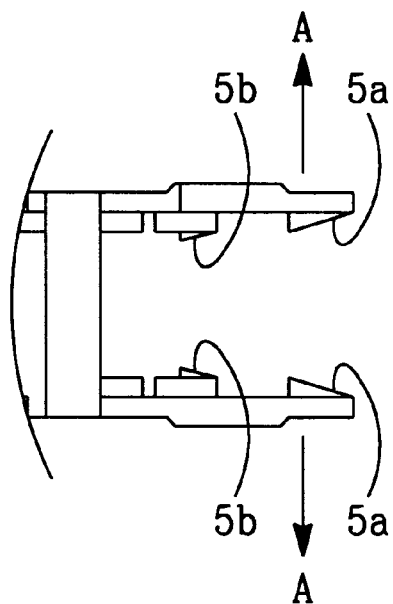
FIG. 10 is an enlarged partial top view of the front portion of the wiper adapter of FIG. 4 showing the retention tabs.
Figure 11:
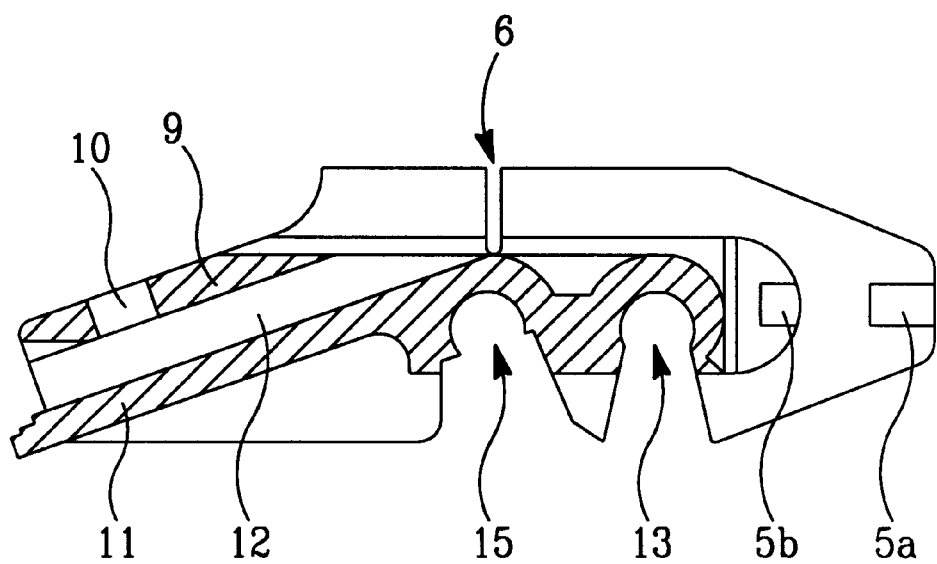
FIG. 11 is a cross sectional view taken along line XI—XI of FIG. 4.
Figure 12:
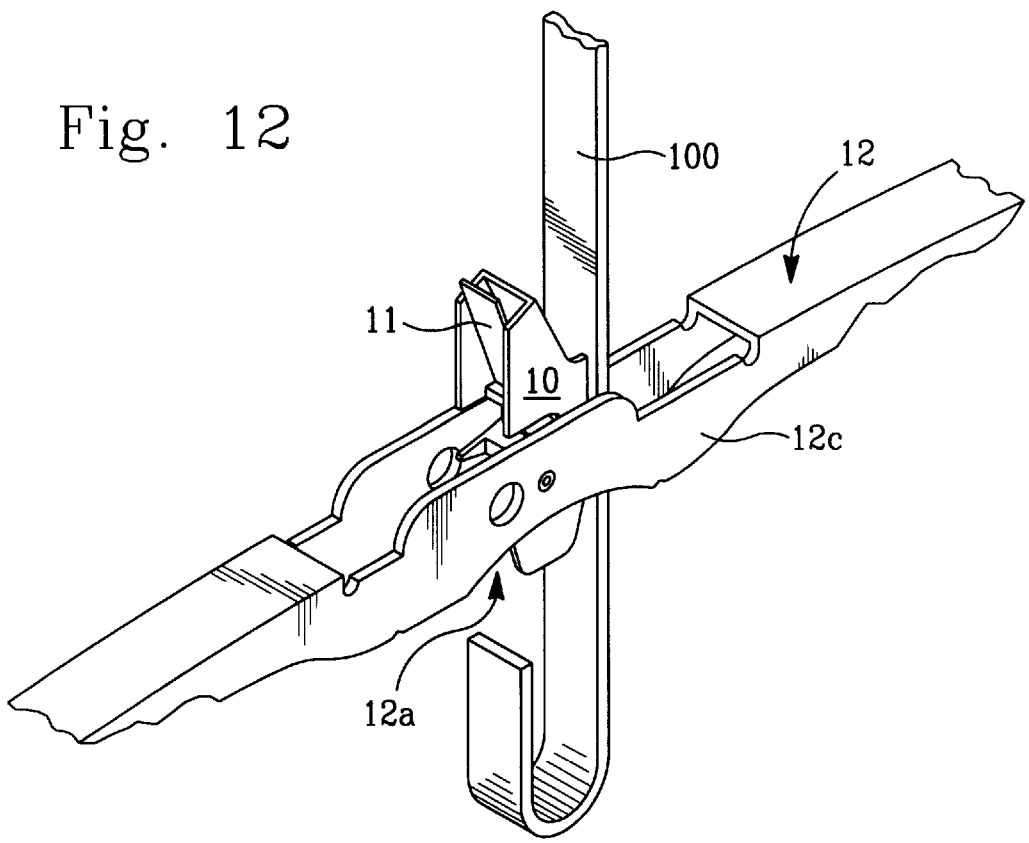
FIG. 12 is a perspective view of the hook-type wiper arm being engaged/disengaged from the wiper blade assembly and adapter 10.
Figure 13:
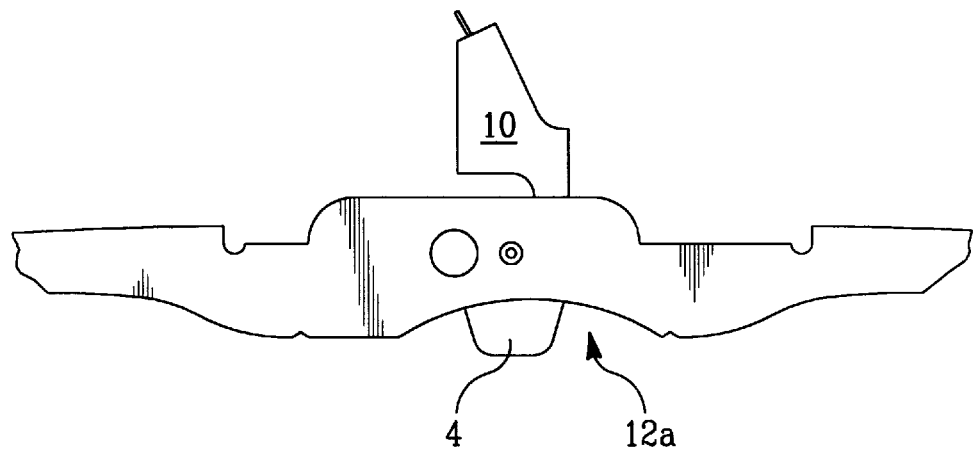
FIG. 13 is a side view showing the main bridge curve or cutout in the middle portion of the wiper frame and the adapter 10 as disposed during the assembly/disassembly stage.

As seen in FIGS. 12 and 13, in order to remove the hook type wiper arm from the wiper frame, the wiper frame must be rotated to an angle of about 90 degrees from the hook type wiper arm. The wing portions 4 sidewalls 1 are then spread apart and the hook type wiper arm is released from the retention tabs 5a, 5c. FIG. 10 shows the direction of spread (direction A) for the wing portions 4. To facilitate removal of the hook type wiper arm from the wiper frame, the main bridge of the wiper frame is provided with a cutout or curve 12a as shown in FIGS. 12 and 13. With the cutout or curve 12a, the sidewalls 1 may be easily spread apart without interference or hindrance from the side frame members of the wiper frame 12; thereby permitting the hook-type wiper arm to be released from the retention tabs 5a, 5b, 5c, 5d. The exterior surface of the sidewalls 1 of the adapter 10 maintain a snug-fit relation with the inner surface of the wiper frame sidewalls 12c (See FIG. 6). Therefore, without the cutout or main bride curve 12a, the sidewalls 1 are maintained in an evenly spaced relation and, as a result, the hook type wiper arm cannot effectively be removed from the wiper frame, i.e. they are effectively blocked by the retention tabs.

As a result of the cutout portion 12a, the wing portions 4 and associated retention tabs 5a, 5b, 5c, 5d are permitted to spread to the disengaged state while the adapter 10 is still affixed to the transverse pin 12b of the wiper frame 12. This improvement is accomplished by the structural and spacial interrelation of the adapter 10 and the cutout portion 12a formed in the wiper frame 12 (See FIGS. 12 and 13). The prior art designs did not permit efficient and effective removal of the hook-type wiper arm, and as a result, the defective prior art design caused adapter breakage and wiper failure.

It is noted that the cutout portion 12a is slightly offset from the longitudinal mid-point of the wiper frame in order to align the cutout portion 12a with the wing portions 4 when the adapter 10 is rotated to approximately 75–90 degrees with respect to the wiper frame (See FIG. 13).

Accordingly, the wiper frame connector 10 of the present invention can be easily used as an adapter for the blade unit 12 to connect to the hook type wiper arm 11, or the pin type wiper arm 110, or the bayonet type wiper arm 116 if necessary. Furthermore, the wiper arms 11, 110 and 116 are tightly and securely connected to the blade unit 12 so that the wiper connector 10 of the present invention achieves an effective connecting operation and improves the wiping performance of the windshield wiper assembly a well as its operational lifetime.

From the invention described above, it will be obvious that the same may be varied in many ways. Such variations are not to be regarded as a departure from the spirit and scope of the invention, and all such modifications as would be obvious to one skilled in the art are intended to be included in the scope of the following claims.

I claim:

1. A wiper frame assembly for supporting a wiper blade for an automobile, said wiper frame assembly comprising:
   a bridge member having a pair of substantially parallel walls extending in a longitudinal direction;
   a yoke assembly adapted to receive a replaceable wiper projecting downwardly from a lower portion of said bridge member, said yoke assembly pivotally affixed to said bridge member;
   a transverse pin extending between said walls;
   a pair of apertures aligned along said longitudinal direction, said apertures adapted to receive a wiper pin passing through both of said walls; and
   a cutout portion formed in a lower edge of at least one of said walls, said cutout portion defining a reduced thickness between an upper edge and said lower edge of said one of said walls adjacent said transverse pin, wherein said cutout portion is substantially aligned with said transverse pin along said longitudinal direction.

2. The wiper frame assembly of claim 1, wherein said cutout portion defines an arc-shaped lower edge extending along said longitudinal direction.

3. The wiper frame assembly of claim 1, wherein said cutout portion is formed in each of said walls.

4. The wiper frame assembly of claim 1, wherein said walls are spaced apart and adapted to receive a wiper adapter member affixed to said transverse pin.

5. The wiper frame assembly of claim 1, wherein said bridge member comprises a middle portion located substantially at a midpoint of said bridge member, said transverse pin, apertures and said cutout portion being disposed at said middle portion.

6. The wiper frame assembly of claim 1, wherein said cutout portion defines a minimal dimension between said lower edge of said one of said walls and said transverse pin.

7. The wiper frame assembly of claim 1, wherein said cutout portion defines an edge that extends toward said transverse pin to thereby enable an ease of installation of a hook-type wiper arm.

8. A combination wiper frame assembly and adaptor for supporting a wiper blade for an automobile, said combination comprising:

a bridge member having a pair of substantially parallel walls extending in a longitudinal direction;

a yoke assembly adapted to receive a replaceable wiper projecting downwardly from a lower portion of said bridge member, said yoke assembly pivotally affixed to said bridge member;

a transverse pin extending between said walls;

a pair of apertures aligned along said longitudinal direction, said apertures adapted to receive a wiper pin passing through both of said walls;

an adapter member adapted to be affixed to said transverse pin through insertion at a top portion of said bridge member between said walls, said adapter member formed with a pair of sidewalls spaced to receive a hook member of a hook-type wiper arm therebetween, and a cutout portion formed in a lower edge of at least one of said walls at a location that is aligned with said transverse pin with respect to said longitudinal direction, said cutout portion providing a reduced dimension between an edge of said at least one of said walls and said transverse pin, wherein said pair of sidewalls formed on said adapter member may be spread apart at said cutout portion.

9. The wiper frame assembly of claim 8, wherein said cutout portion defines an arc-shaped lower edge extending along said longitudinal direction.

10. The wiper frame assembly of claim 8, wherein said cutout portion is formed in each of said walls.

11. The wiper frame assembly of claim 8, wherein said walls are spaced apart and adapted to receive a wiper adapter member affixed to said transverse pin.

12. The wiper frame assembly of claim 8, wherein said bridge member comprises a middle portion located substantially at a midpoint of said bridge member, said transverse pin, apertures and said cutout portion being disposed at said middle portion.

13. The wiper frame assembly of claim 8, wherein said cutout portion defines a minimal dimension between an edge of one of said walls and said transverse pin.

14. The wiper frame assembly of claim 8, wherein each of said sidewalls are sized to extend beyond an edge defined by said cutout portion when oriented toward said cutout portion.

* * * * *